US010049214B2

(12) United States Patent
Ferrie (10) Patent No.: US 10,049,214 B2
(45) Date of Patent: Aug. 14, 2018

(54) SYSTEMS AND METHODS FOR DETECTING MALICIOUS PROCESSES ON COMPUTING DEVICES (71) Applicant: Symantec Corporation, Mountain View, CA (US)

(72) Inventor: Peter Ferrie, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 30 days.

(21) Appl. No.: 15/263,400

(22) Filed: Sep. 13, 2016

(65) Prior Publication Data
US 2018/0075238 A1   Mar. 15, 2018

(51) Int. Cl.
G06F 17/30 (2006.01)
G06F 21/56 (2013.01)
G06F 21/62 (2013.01)

(52) U.S. Cl.
CPC ........ G06F 21/566 (2013.01); G06F 21/6218 (2013.01)

(58) Field of Classification Search
CPC .......................... G06F 21/566; G06F 21/6218
See application file for complete search history.

(56) References Cited

U.S. PATENT DOCUMENTS

| 8,515,075 | B1 | 8/2013 | Saraf et al. |
| 8,539,578 | B1 | 9/2013 | Zhou et al. |
| 9,509,697 | B1* | 11/2016 | Salehpour ............... G06F 21/52 |
| 2002/0046351 | A1* | 4/2002 | Takemori ............... G06F 21/55 726/23 |
| 2015/0319183 | A1* | 11/2015 | Liske .................. H04L 63/1416 726/23 |
| 2015/0363597 | A1* | 12/2015 | Levine-Fraiman ..... G06F 21/56 726/23 |

FOREIGN PATENT DOCUMENTS

WO   WO 2016079602 A1   5/2016

OTHER PUBLICATIONS

Dynamic Link Library; https://en.wikipedia.org/wiki/Dynamic-link_library; as accessed Aug. 23, 2016.
(Continued)

*Primary Examiner* — Mohammed Waliullah
(74) *Attorney, Agent, or Firm* — FisherBroyles, LLP (57) ABSTRACT The disclosed computer-implemented method for detecting malicious processes on computing devices may include (i) identifying a portion of data on a computing device that is stored in an unrestricted section of memory and accessed by processes while running on the computing device, (ii) allocating a restricted section of memory within the computing device and indicating that the portion of data is located in the restricted section of memory, (iii) detecting an attempt by a process running on the computing device to access the portion of data within the restricted section of memory using an unexpected access method, (iv) determining, based at least in part on the process attempting to access the portion of data within the restricted section of memory using the unexpected access method, that the process is malicious, and (v) performing a security action on the computing device to prevent the malicious process from harming the computing device.

18 Claims, 6 Drawing Sheets (56) References Cited

OTHER PUBLICATIONS

ROP Primer v0.2 level 2; http://blog.the-playground.dk/2015/08/rop-primer-v02-level-2.html; Aug. 6, 2015; as accessed on Sep. 1, 2015.
Peter Ferrie et al.; Systems and Methods for Detecting Gadgets on Computing Devices; U.S. Appl. No. 15/260,961, filed Sep. 9, 2016.

* cited by examiner

SYSTEMS AND METHODS FOR DETECTING MALICIOUS PROCESSES ON COMPUTING DEVICES

BACKGROUND

Attackers may hijack or gain control of a computing device by injecting small portions of code (e.g., shellcode) into processes running on the device. For example, an attacker may insert a portion of code into an executable file that exploits security deficiencies of a device to open a command shell, which may be used by the attacker to control the device. Due to the potentially harmful consequences of these attacks (e.g., the unauthorized distribution of sensitive data and/or a user's loss of control of a computing device), security systems may attempt to detect and prevent maliciously-exploited processes on computing devices.

Unfortunately, traditional security services for detecting exploited or otherwise malicious processes may be unable to identify these processes until after they have already compromised a computing device. For example, a conventional security technology may determine that a process has been maliciously-exploited only after the process has performed one or more suspicious or dangerous behaviors. The instant disclosure, therefore, identifies and addresses a need for systems and methods for detecting malicious processes on computing devices.

SUMMARY

As will be described in greater detail below, the instant disclosure describes various systems and methods for detecting malicious processes on computing devices. In one example, a method for performing such a task may include (i) identifying a portion of data on a computing device that is stored in an unrestricted section of memory and accessed by processes while running on the computing device, (ii) allocating a restricted section of memory within the computing device and indicating that the portion of data is located in the restricted section of memory instead of the unrestricted section of memory that actually stores the portion of data, (iii) detecting an attempt by a process running on the computing device to access the portion of data within the restricted section of memory using an unexpected access method, (iv) determining, based at least in part on the process attempting to access the portion of data within the restricted section of memory using the unexpected access method, that the process is malicious, and then (v) performing a security action on the computing device to prevent the malicious process from harming the computing device. In some embodiments, the security action may include terminating the malicious process and/or warning an administrator of the computing device about the malicious process.

In some examples, identifying the portion of data on the computing device may include identifying a shared library accessed by the processes on the computing device to perform an initial task immediately after the processes begin running. In these examples, identifying the shared library may include searching a Process Environment Block (PEB) data structure to identify a base memory address of the shared library. Additionally in these examples, indicating that the portion of data is located in the restricted section of memory may include overwriting the base memory address of the shared library within the process environment block data structure with a memory address of the restricted section of memory.

In some embodiments, detecting the attempt by the process to access the restricted section of memory may include registering a vectored exception handler to intercept any attempt by the processes running on the computing device to access the restricted section of memory. In addition, in some examples, detecting the attempt by the process to access the restricted section of memory using the unexpected access method may include determining that the process is attempting to access the restricted section of memory using an Application Program Interface (API) that is not documented as an API used by non-malicious processes.

In some embodiments, the method may further include detecting an attempt by an additional process running on the computing device to access the portion of data within the restricted section of memory using an expected access method. In one example, the expected access method may include an API documented as being used by non-malicious processes. In some examples, the method may also include determining that the additional process is non-malicious based at least in part on the additional process using the expected access method while attempting to access the portion of data within the restricted section of memory. In these examples, the method may include allowing the non-malicious process to access the portion of data within the unrestricted section of memory by (i) prior to indicating that the portion of data is located in the restricted section of memory, identifying and storing a memory address of the unrestricted section of memory and (ii) after detecting the attempt by the non-malicious process to access the portion of data within the restricted section of memory, indicating, to the non-malicious process, the memory address of the unrestricted section of memory.

In one embodiment, a system for detecting malicious processes on computing devices may include several modules stored in memory, including (i) an identification module that identifies a portion of data on a computing device that is stored in an unrestricted section of memory and accessed by processes while running on the computing device, (ii) an allocation module that allocates a restricted section of memory within the computing device and indicates that the portion of data is located in the restricted section of memory instead of the unrestricted section of memory that actually stores the portion of data, (iii) a detection module that detects an attempt by a process running on the computing device to access the portion of data within the restricted section of memory using an unexpected access method, (iv) a determination module that determines, based at least in part on the process attempting to access the portion of data within the restricted section of memory using the unexpected access method, that the process is malicious, and (v) a security module that performs a security action on the computing device to prevent the malicious process from harming the computing device. In addition, the system may include at least one hardware processor configured to execute the identification module, the allocation module, the detection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a portion of data on the computing device that is stored in an unrestricted section of memory and accessed by processes while running on the computing device, (ii) allocate a restricted section of memory within the computing device and indicate that the portion of data is located in the restricted section of memory instead of the unrestricted section of memory that actually stores the portion of data, (iii) detect an attempt by a process running on the computing device to access the portion of data within the restricted section of memory using an unexpected access method, (iv) determine, based at least in part on the process attempting to access the portion of data within the restricted section of memory using the unexpected access method, that the process is malicious, and then (v) perform a security action on the computing device to prevent the malicious process from harming the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting malicious processes on computing devices. As will be explained in greater detail below, by indicating that a portion of data required by processes to execute (e.g., a base address of a shared library) is located within a restricted or protected section of memory, the systems and methods described herein may detect malicious processes that attempt to access the data. For example, the disclosed systems and methods may determine that an unexpected or undocumented method of accessing data that appears to be located within a protected section of memory is likely performed by a maliciously-exploited process. As such, the systems and methods described herein may terminate the exploited process before the process is able to perform any harmful behaviors (e.g., hijacking or controlling a computing device).

In addition, the systems and methods described herein may improve the functioning of a computing device by preventing malicious processes from accessing critical portions of data that may enable the processes to compromise the computing device. These systems and methods may also improve the field of computing security (in particular, the field of exploit prevention) by detecting maliciously-exploited processes more quickly and with fewer computing resources than traditional security services. Furthermore, by indicating that a portion of data is stored in a restricted section of memory (rather than actually storing all or a portion of the data within restricted memory), the disclosed systems and methods may prevent disruptions to non-malicious processes that attempt to access the data for legitimate purposes.

Figure 1:
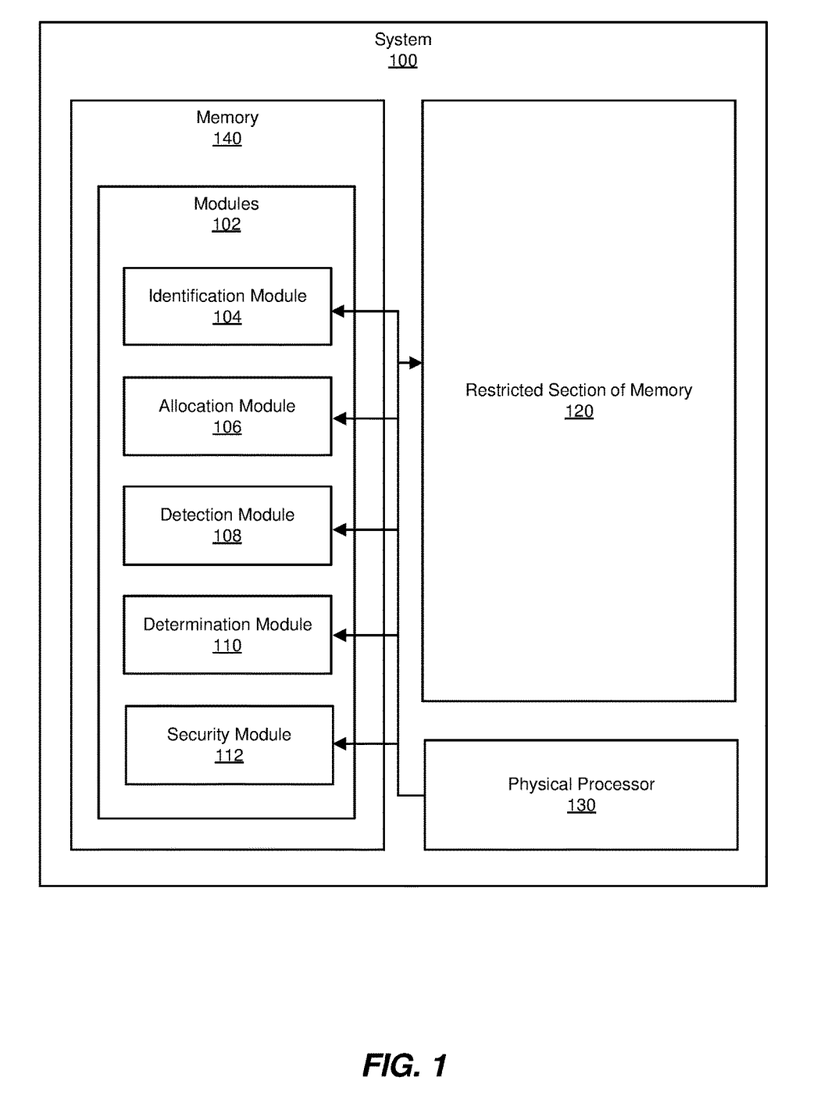
FIG. 1 is a block diagram of an example system for detecting malicious processes on computing devices.
Figure 2:
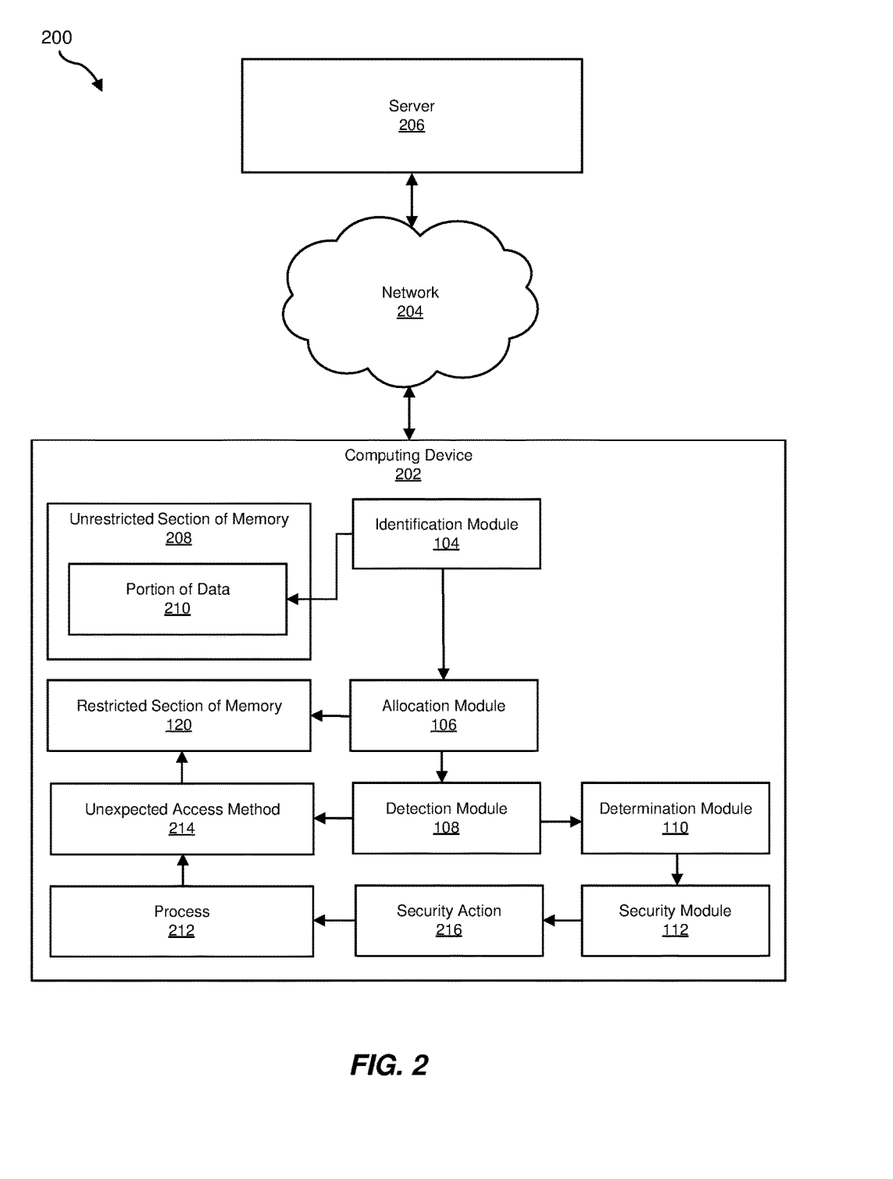
FIG. 2 is a block diagram of an additional example system for detecting malicious processes on computing devices.

The following will provide, with reference to FIGS. 1 and 2, detailed descriptions of example systems for detecting malicious processes on computing devices. Detailed descriptions of corresponding computer-implemented methods will also be provided in connection with FIG. 3. In addition, detailed descriptions of searching PEB data structures to identify base memory addresses of shared libraries will be provided in connection with FIG. 4. Finally, detailed descriptions of an exemplary computing system and network architecture capable of implementing one or more of the embodiments described herein will be provided in connection with FIGS. 5 and 6, respectively.

FIG. 1 is a block diagram of an example system 100 for detecting malicious processes on computing devices. As illustrated in this figure, example system 100 may include one or more modules 102 for performing one or more tasks. As will be explained in greater detail below, system 100 may include an identification module 104 that identifies a portion of data on a computing device that is stored in an unrestricted section of memory and accessed by processes while running on the computing device. In addition, example system 100 may include an allocation module 106 that allocates a restricted section of memory within the computing device and indicates that the portion of data is located in the restricted section of memory instead of the unrestricted section of memory that actually stores the portion of data. System 100 may also include a detection module 108 that detects an attempt by a process running on the computing device to access the portion of data within the restricted section of memory using an unexpected access method.

As will be explained in greater detail below, system 100 may additionally include a determination module 110 that determines, based at least in part on the process attempting to access the portion of data within the restricted section of memory using the unexpected access method, that the process is malicious. Finally, system 100 may include a security module 112 that performs a security action on the computing device to prevent the malicious process from harming the computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks.

For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include a restricted section of memory 120. As will be explained in greater detail below, restricted section of memory 120 generally represents any type or form of storage device or medium generated or allocated by a security service to detect maliciously-exploited processes. In some examples, restricted section of memory 120 may represent a dedicated portion of memory 140. In other examples, section of memory 120 may reside outside of memory 140, such as within an alternative section of memory within computing device 202.

In addition, as illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting malicious processes on computing devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to detect malicious processes on computing devices. For example, and as will be described in greater detail below, identification module 104 may cause computing device 202 and/or server 206 to identify a portion of data 210 on computing device 202 that is stored in an unrestricted section of memory 208. Next, allocation module 106 may cause computing device 202 and/or server 206 to allocate restricted section of memory 120 within computing device 202 and indicate that portion of data 210 is located in restricted section of memory 120 instead of unrestricted section of memory 208. Detection module 108 may then cause computing device 202 and/or server 206 to detect an attempt by a process 212 to access portion of data 210 within restricted section of memory 120 using an unexpected access method 214. In addition, determination module 110 may cause computing device 202 and/or server 206 to determine that process 212 is malicious based on the attempt by process 212 to access portion of data 210 within restricted section of memory 120 using unexpected access method 214. Finally, security module 112 may cause computing device 202 and/or server 206 to perform a security action 216 on computing device 202 to prevent process 212 from harming computing device 202.

Computing device 202 generally represents any type or form of computing device capable of reading computer-executable instructions. For example, computing device 202 may represent an endpoint device (e.g., a cellular phone or desktop computer of a user) running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of monitoring and/or analyzing the behavior of processes running on computing devices. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
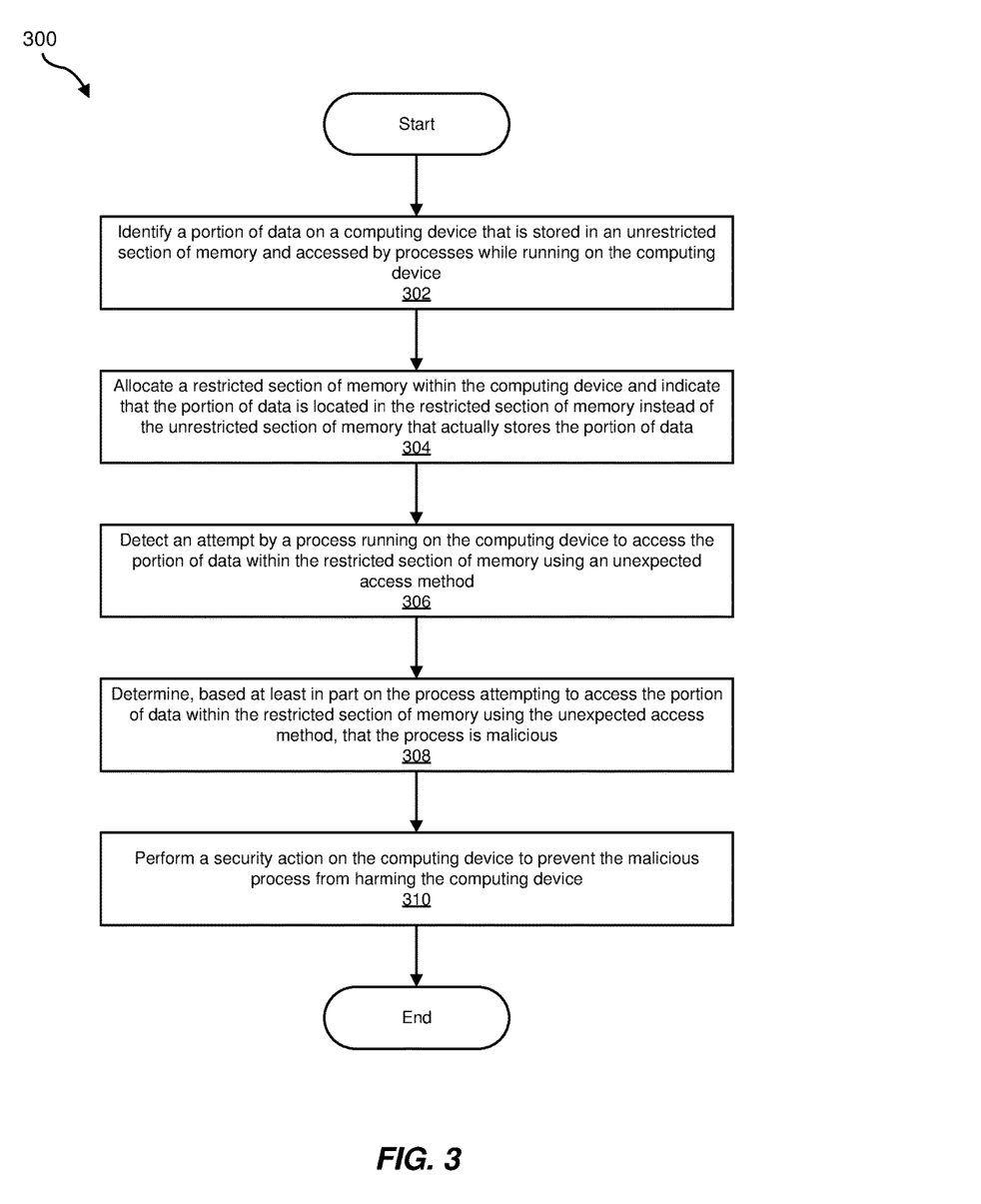
FIG. 3 is a flow diagram of an example method for detecting malicious processes on computing devices.

FIG. 3 is a flow diagram of an example computer-implemented method 300 for detecting malicious processes on computing devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a portion of data on a computing device that is stored in an unrestricted section of memory and accessed by processes while running on the computing device. For example, identification module 104 may, as part of computing device 202 in FIG. 2, identify portion of data 210 that is stored in unrestricted section of memory 208.

The term "process," as used herein, generally refers to any type or form of program, application, or portion of executable code that may be executed or run by a computing device. As will be explained in greater detail below, the systems described herein may determine whether a process is malicious or non-malicious. The term "non-malicious process," as used herein, generally refers to any process that performs only trusted, verified behaviors and does not compromise the security state of a computing device. In contrast, the term "malicious process," as used herein, generally refers to any process designed to perform harmful computing behaviors and/or capable of being exploited to perform harmful computing behaviors. In one embodiment, the systems described herein may be configured to detect malicious processes such as maliciously-exploited gadgets and widgets and/or processes capable of performing zero-day exploits.

In addition, the term "portion of data," as used herein, generally refers to any type or form of information, file, executable code, or resource stored within a computing device that is requested or required by a process to perform one or more tasks. In one example, a shared library (e.g., a Dynamic-Linked Library (DLL) in a WINDOWS operating system) may represent such a portion of data. In some embodiments, a process may access a shared library to perform tasks such as resolving APIs, allocating memory, downloading files, etc. A shared library may be simultaneously accessed by multiple processes on a computing device and may contain information critical to the execution of both malicious and non-malicious processes.

The systems described herein may identify a portion of data used by processes while running on a computing device in a variety of ways. In some examples, identification module 104 may identify a portion of data that is accessed by processes to perform an initial task (e.g., a task performed immediately after the processes begin running). For example, identification module 104 may identify a DLL that enables a process to allocate sufficient memory space for execution. By identifying critical portions of data that are necessary for a process to begin or continue executing, the disclosed security services may detect malicious processes running on a computing device before the processes are able to perform behaviors that harm the computing device.

In some embodiments, a process may identify the base (e.g., initial) memory address of a portion of data before being able to access and utilize the portion of data. For example, both malicious and non-malicious processes may be required to identify the base memory address of a DLL in order to access information within the DLL. Accordingly, identification module 104 may also identify the base memory address of a DLL in order to monitor attempts by processes to access the DLL. In one example, identification module 104 may identify a base memory address of a DLL by following one or more PEB data structures associated with the DLL.

Figure 4:
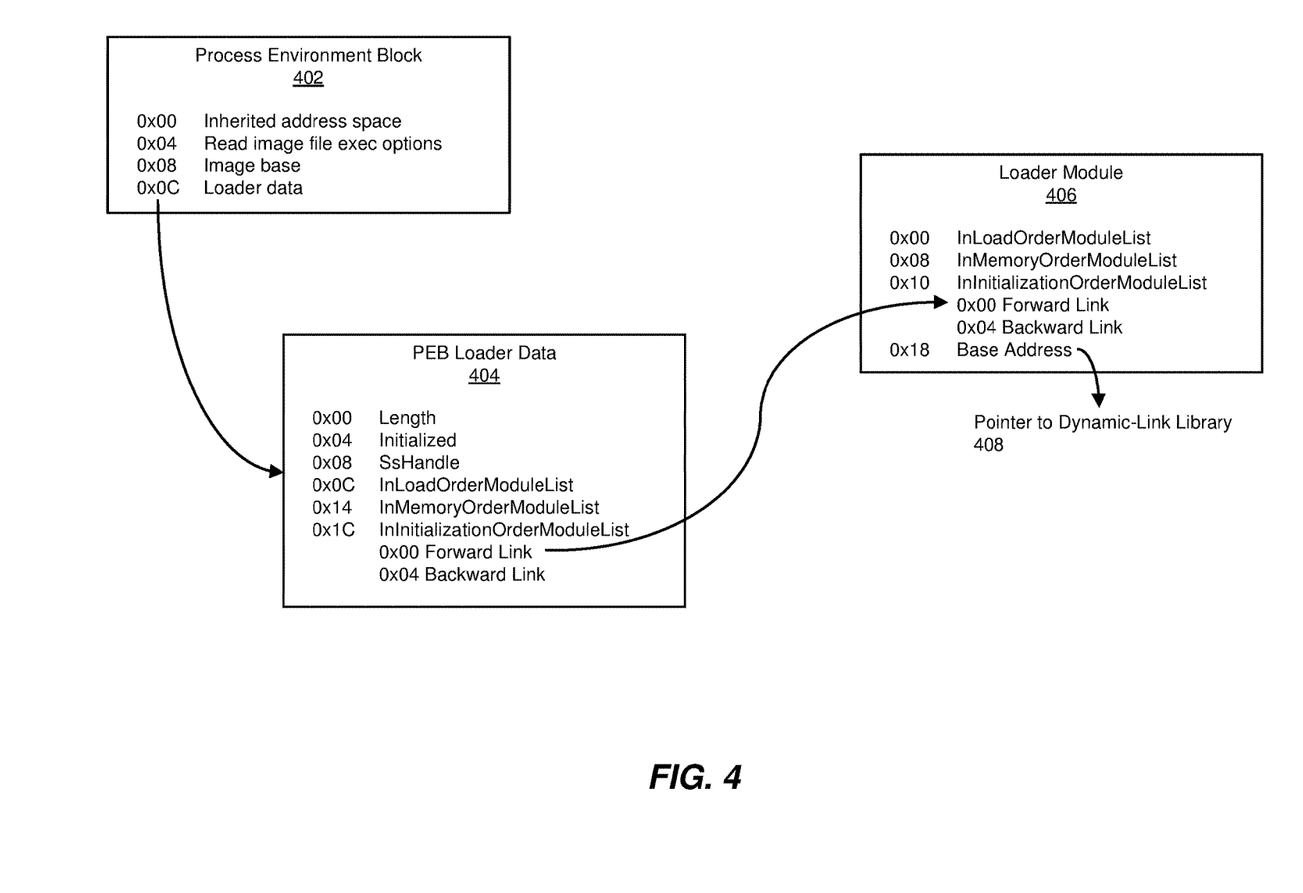
FIG. 4 is an illustration of searching PEB data structures to identify a base memory address of a shared library.

FIG. 4 illustrates the process of following a PEB loader chain to identify the base memory address of a DLL. In this example, identification module 104 may identify a PEB 402 that contains links or pointers to files or data associated with one or more DLLs. As indicated by the arrow beginning in PEB 402, identification module 104 may identify the entry "loader data" at location 0x0C within PEB 402 and use that entry to identify PEB loader data 404. Identification module 104 may then search PEB loader data 404 until identifying an entry labeled "InInitializationOrderModuleList" at location 0x1C. As shown in FIG. 4, this entry may contain a linked list, which includes a forward link and a backward link that enable processes to jump to and from additional data structures that contain information about particular DLLs. In the example of FIG. 4, identification module 104 may follow the forward link within PEB loader data 404 to a loader module 406. Once identification module 104 has accessed loader module 406, identification module 104 may determine that the "base address" entry at location 0x18 represents a pointer to DLL 408. Accordingly, identification module 104 may identify and record the indicated value of the base memory address.

Returning to FIG. 3, at step 304 one or more of the systems described herein may allocate a restricted section of memory within the computing device and indicate that the portion of data is located in the restricted section of memory instead of the unrestricted section of memory that actually stores the portion of data. For example, allocation module 106 may, as part of computing device 202, allocate restricted section of memory 120 and indicate that portion of data 210 is located within restricted section of memory 120 instead of unrestricted section of memory 208.

The term "section of memory," as used herein, generally refers to any portion of memory dedicated to storing a particular type and/or amount of data. A section of memory may be of any size, for example ranging from a single bit to multiple bytes. In addition, the term "restricted section of memory," as used herein, generally refers to any section of memory that is protected from being accessed by one or more processes, users, or other entities. For example, a restricted section of memory may represent a dedicated section of memory that cannot be overwritten and/or read by any process that does not have administrator privileges. Additionally or alternatively, a restricted section of memory may be hidden from or otherwise inaccessible to certain processes. In contrast, the term "unrestricted section of memory," as used herein, generally refers to any section of memory that has few or no access limitations (e.g., a section of memory that allows any process to access the data within the section of memory). In some examples, operating systems may store commonly-accessed portions of data (such as DLLs and other shared libraries) in unrestricted sections of memory.

The systems described herein may allocate a restricted section of memory within a computing device in a variety of ways. In some examples, allocation module 106 may assume or be granted administrator rights or privileges within a computing device in order to allocate restricted sections of memory. In addition, in some embodiments, allocation module 106 may allocate restricted sections of memory of a predetermined size. For example, allocation module 106 may allocate restricted memory pages that each contain a predetermined number of bytes.

After allocating a restricted section of memory, allocation module 106 may indicate that the restricted section of memory stores a portion of data identified by identification module 104. For example, allocation module 106 may replace, within a data structure that indicates the base memory address of the portion of data, the actual base memory address of the data with the memory address of the restricted section of memory. In some examples, allocation module 106 may also indicate that this new memory address is associated with a restricted section of memory.

In the example of FIG. 4, after identification module 104 identifies the base memory address of a DLL based on pointer to DLL 408, allocation module 106 may allocate a restricted page of memory and then replace pointer to DLL 408 with a pointer that leads to the restricted page of memory. As such, any process that is attempting to identify the base address of the DLL may determine that the base address is located at the memory address of the restricted page of memory, rather than the actual memory address.

By replacing an actual memory address of a portion of data with a memory address of a restricted section of memory, allocation module 106 may create a decoy memory address that merely appears to store the portion of data. As will be explained in greater detail below, such a decoy address may be used to detect malicious processes on a computing device, as well as to prevent the malicious processes from accessing and using critical portions of data to perform harmful computing behaviors.

Returning to FIG. 3, at step 306 one or more of the systems described herein may detect an attempt by a process running on the computing device to access the portion of data within the restricted section of memory using an unexpected access method. For example, detection module 108 may, as part of computing device 202 in FIG. 2, detect an attempt by process 212 to access portion of data 210 within restricted section of memory 120 using unexpected access method 214.

The term "access method," as used herein, generally refers to any type or form of technique or protocol by which a process attempts to read, locate, or open a portion of data. Examples of access methods include, without limitation, executable instructions and APIs involved in loading, reading, and retrieving data from memory.

The systems described herein may detect an attempt by a process to access a restricted section of memory in a variety of ways. In some examples, detection module 108 may monitor a restricted section of memory that allocation module 106 has indicated stores a portion of data to detect each attempt by processes running on a computing device to access the restricted section of memory. In one embodiment, detection module 108 may hook or intercept calls or other requests by processes to access the restricted section of memory. In particular, detection module 108 may register an exception handler (e.g., a vectored exception handler) to detect each instance that a process attempts to access the restricted section of memory. The exception handler may alert the systems described herein after each detected access attempt, as well as permanently or temporarily block the access attempt.

In some examples, detection module 108 may analyze a detected access attempt to determine whether the access attempt was performed using an expected or unexpected access method. The term "expected access method," as used herein, generally refers to any type or form of access method that is predictable, known, or documented. For example, an expected access method may involve a particular API that legitimate processes are configured to utilize to access certain portions of data or memory addresses. In some embodiments, expected access methods for accessing restricted sections of memory may differ from expected access methods for accessing unrestricted sections of memory. In other embodiments, a process or operating system may not have or be associated with any expected access methods for accessing restricted sections of memory.

In contrast, the term "unexpected access method," as used herein, generally refers to any type or form of access method that is not known to be used by or associated with legitimate processes. In some examples, an unexpected access method (e.g., involving an undocumented API) may indicate that a process is attempting to maliciously gain access to a portion of data and/or avoid detection by security services.

In some embodiments, detection module 108 may determine whether an access attempt is expected or unexpected by comparing one or more protocols or techniques (e.g., APIs) involved in the access attempt to a list or database of expected access methods. In one example, such a list may be generated by a developer of an operating system. In the event that a detected access method does not match any expected access methods, detection module 108 may determine that the access attempt is unexpected.

Returning to FIG. 3, at step 308 one or more of the systems described herein may determine, based at least in part on the process attempting to access the portion of data within the restricted section of memory using the unexpected access method, that the process is malicious. For example, determination module 110 may, as part of computing device 202 in FIG. 2, determine that process 212 is malicious based at least in part on detecting the attempt by process 212 to access portion of data 210 within restricted section of memory 120 using unexpected access method 214.

The systems described herein may determine whether a process is malicious based on an access attempt performed by the process in a variety of ways. In some examples, determination module 110 may determine that any process that attempted to access a restricted section of memory using an undocumented and/or suspicious access method (e.g., an unusual or unverified API) is likely malicious. For example, determination module 110 may determine that only a malicious process would perform such a behavior, as non-malicious processes may generally be configured to implement different types of access methods. As such, determination module 110 may determine that a process that is using an undocumented or unexpected access method is likely trying to maliciously gain access to data that may enable the process to perform harmful behaviors on a computing device (such as executing malicious shellcode). In contrast, determination module 110 may determine that any process that attempted to access a restricted section of memory using an expected access method is likely non-malicious.

Returning to FIG. 3, at step 310 one or more of the systems described herein may perform a security action on the computing device to prevent the malicious process from harming the computing device. For example, security module 112 may, as part of computing device 202 in FIG. 2, perform security action 216 on computing device 202 to prevent process 212 from harming computing device 202.

The systems described herein may perform a security action to prevent a malicious process from harming a computing device in a variety of ways. In some examples, security module 112 may terminate a process that determination module 110 determined to be malicious. In particular, security module 112 may terminate a malicious process before the process has a chance to perform any malicious behaviors on a computing device (e.g., immediately after the process attempts to access a restricted section of memory using an unexpected access method). In other examples, security module 112 may allocate additional resources to further analyze a process for malicious characteristics. For example, security module 112 may permit a potentially malicious process to execute within a partitioned or controlled computing environment to identify unusual or dangerous behaviors of the process before determining whether the process should be allowed to run on a computing device.

Additionally or alternatively, security module 112 may warn a user, administrator, or security service associated with a computing device about a malicious process that was detected on the computing device. For example, in the event that the disclosed security services are implemented within a client-side device in communication with a backend security server, security module 112 may send a report about a detected malicious process to the security server.

As explained above, in some examples, the disclosed systems may determine that a non-malicious process is attempting to access a portion of data within a restricted section of memory. In these examples, security module 112 may permit the non-malicious process to access the data within the unrestricted section of memory that actually stores the data, thereby preventing disruptions to the execution of the non-malicious process. In one example, security module 112 may allow a non-malicious process to access a portion of data by providing the memory address of the unrestricted section of memory that stores the portion of data to the non-malicious process. Specifically, security module 112 may temporarily restore the base memory address of the portion of data within a PEB loader chain associated with the portion of data.

In the example of FIG. 4, security module 112 may temporarily restore the original value of pointer to DLL 408 (which was changed in step 304 to lead to a restricted section of memory). Furthermore, once an identified non-malicious process has accessed the DLL, security module 112 may revert pointer to DLL 408 to lead back to the restricted section of memory.

As explained above in connection with FIG. 3, a security service may identify and block malicious processes running on a computing device. For example, the security service may identify a portion of data (e.g., a shared or linked library) that is commonly accessed by processes to perform certain tasks on the computing device. The security service may then indicate that the base memory address of the portion of data is within a restricted section of memory. Because a malicious process may attempt to access the restricted section of memory in a different manner than a non-malicious process, the security service may determine whether a process attempting to access the portion of data is malicious or non-malicious. In response to detecting an attempt by a non-malicious process to access the portion of data, the security service may permit the process to access the data (e.g., by providing the actual memory location of the data to the process). However, in the event that the security service detects an attempt by a malicious process to access the data, the security service may perform one or more security actions to prevent the malicious process from compromising the security state of the computing device.

Figure 5:
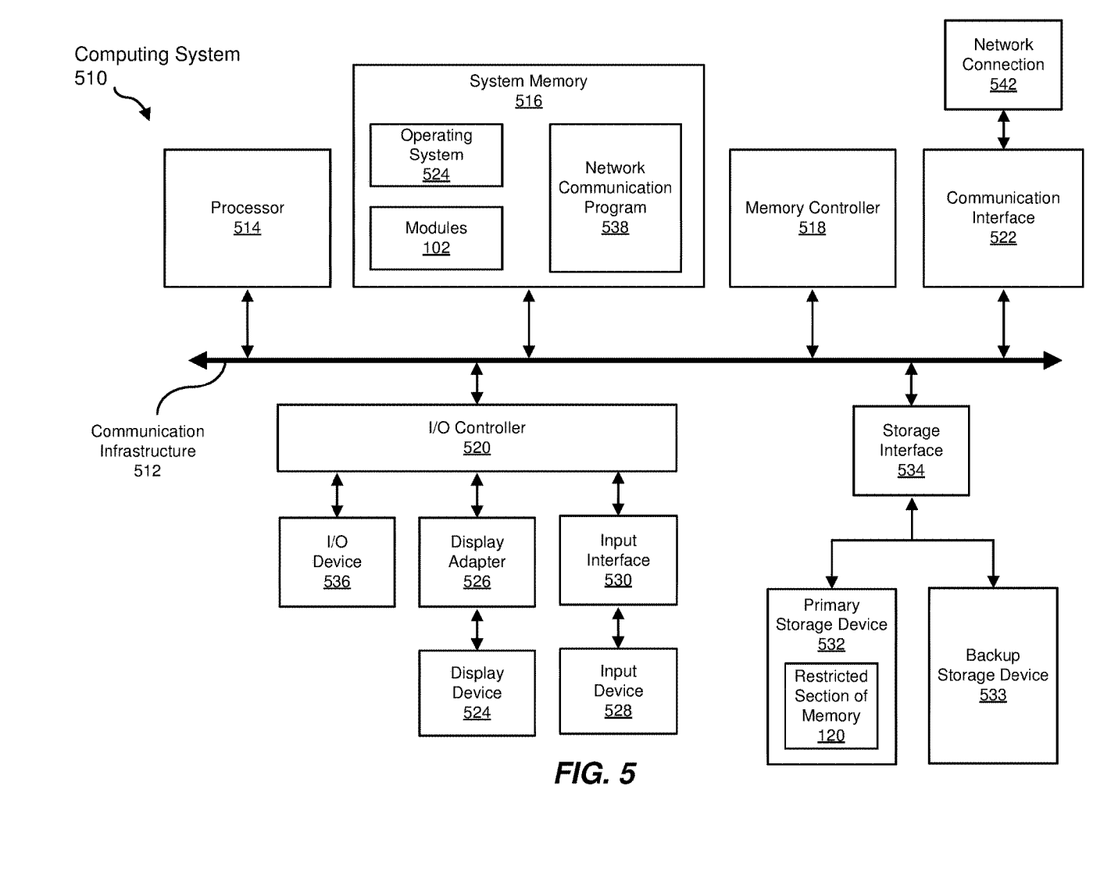
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, restricted section of memory 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
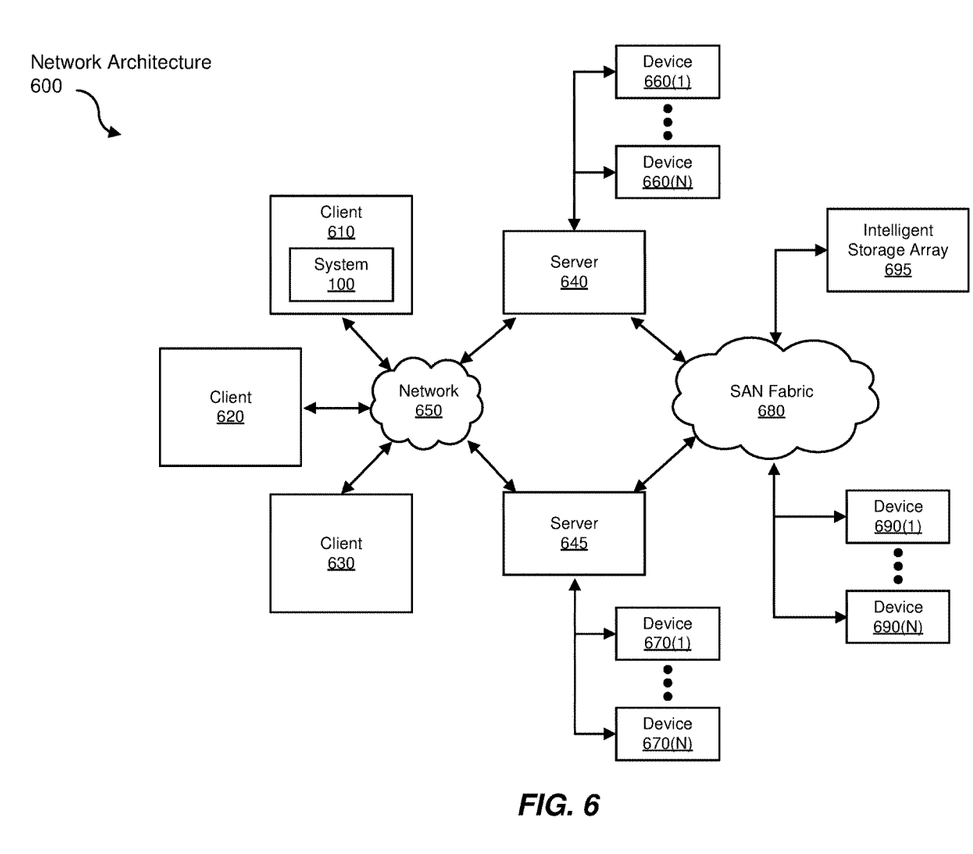
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting malicious processes on computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive an attempt by a process running on a computing device to access a restricted section of memory that appears to contain a portion of data, transform the access attempt into an indication that the process is malicious, output a result of the transformation to a user or administrator of the computing device, use the result of the transformation to prevent the malicious process from harming the computing device, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malicious processes on computing devices, at least a portion of the method being performed by a computing device comprising at least one processor, the method comprising:
    identifying a portion of data on the computing device that is stored in an unrestricted section of memory and accessed by processes while running on the computing device;
    allocating a restricted section of memory within the computing device;
    indicating that the portion of data is located in the restricted section of memory instead of the unrestricted section of memory that actually stores the portion of data by:
        identifying a base memory address of the portion of data; and
        overwriting the base memory address of the portion of data with a memory address of the restricted section of memory;
    detecting an attempt by a process running on the computing device to access, using an unexpected access method, the portion of data within the restricted section of memory;
    determining, based at least in part on the process attempting to access the portion of data within the restricted section of memory using the unexpected access method, that the process is malicious; and
    performing a security action on the computing device to prevent the malicious process from harming the computing device.

2. The method of claim 1, wherein identifying the portion of data on the computing device comprises identifying a shared library accessed by the processes on the computing device to perform an initial task immediately after the processes begin running.

3. The method of claim 2, wherein identifying the base memory address of the portion of data comprises searching a process environment block data structure to identify a base memory address of the shared library.

4. The method of claim 1, wherein detecting the attempt by the process to access the restricted section of memory comprises registering a vectored exception handler to intercept any attempt by the processes running on the computing device to access the restricted section of memory.

5. The method of claim 1, wherein detecting the attempt by the process to access the restricted section of memory using the unexpected access method comprises determining that the process is attempting to access the restricted section of memory using an application program interface that is not documented as an application program interface used by non-malicious processes.

6. The method of claim 1, further comprising:
    detecting an attempt by an additional process running on the computing device to access, using an expected access method, the portion of data within the restricted section of memory;
    determining, based at least in part on the additional process attempting to access the portion of data within the restricted section of memory using the expected access method, that the additional process is non-malicious; and
    allowing the non-malicious process to access the portion of data within the unrestricted section of memory.

7. The method of claim 6, wherein detecting the attempt by the additional process to access the restricted section of memory using the expected access method comprises determining that the additional process is attempting to access the restricted section of memory using an application program interface that is documented as an application program interface used by non-malicious processes.

8. The method of claim 6, wherein allowing the non-malicious process to access the portion of data within the unrestricted section of memory comprises:
    prior to indicating that the portion of data is located in the restricted section of memory, identifying and storing a memory address of the unrestricted section of memory; and
    after detecting the attempt by the non-malicious process to access the portion of data within the restricted section of memory, indicating, to the non-malicious process, the memory address of the unrestricted section of memory.

9. The method of claim 1, wherein the security action comprises at least one of:
    terminating the malicious process; and
    warning an administrator of the computing device about the malicious process.

10. A system for detecting malicious processes on computing devices, the system comprising:
    an identification module, stored in memory, that identifies:
        a portion of data on a computing device that is stored in an unrestricted section of memory and accessed by processes while running on the computing device; and
        a base memory address of the portion of data;
    an allocation module, stored in memory, that:
        allocates a restricted section of memory within the computing device; and
        indicates that the portion of data is located in the restricted section of memory instead of the unrestricted section of memory that actually stores the portion of data by overwriting the base memory address of the portion of data with a memory address of the restricted section of memory;
    a detection module, stored in memory, that detects an attempt by a process running on the computing device to access, using an unexpected access method, the portion of data within the restricted section of memory;

a determination module, stored in memory, that determines, based at least in part on the process attempting to access the portion of data within the restricted section of memory using the unexpected access method, that the process is malicious;

a security module, stored in memory, that performs a security action on the computing device to prevent the malicious process from harming the computing device; and at least one hardware processor configured to execute the identification module, the allocation module, the detection module, the determination module, and the security module.

11. The system of claim 10, wherein the identification module identifies the portion of data on the computing device by identifying a shared library accessed by the processes on the computing device to perform an initial task immediately after the processes begin running.

12. The system of claim 11, wherein the identification module identifies the base memory address of the portion of data by searching a process environment block data structure to identify a base memory address of the shared library.

13. The system of claim 10, wherein the detection module detects the attempt by the process to access the restricted section of memory by registering a vectored exception handler to intercept any attempt by the processes running on the computing device to access the restricted section of memory.

14. The system of claim 10, wherein the detection module detects the attempt by the process to access the restricted section of memory using the unexpected access method by determining that the process is attempting to access the restricted section of memory using an application program interface that is not documented as an application program interface used by non-malicious processes.

15. The system of claim 10, wherein:
the detection module further detects an attempt by an additional process running on the computing device to access, using an expected access method, the portion of data within the restricted section of memory;
the determination module further determines, based at least in part on the additional process attempting to access the portion of data within the restricted section of memory using the expected access method, that the additional process is non-malicious; and
the security module further allows the non-malicious process to access the portion of data within the unrestricted section of memory.

16. The system of claim 15, wherein the detection module detects the attempt by the additional process to access the restricted section of memory using the expected access method by determining that the additional process is attempting to access the restricted section of memory using an application program interface that is documented as an application program interface used by non-malicious processes.

17. The system of claim 10, wherein the security action comprises at least one of:
terminating the malicious process; and
warning an administrator of the computing device about the malicious process.

18. A non-transitory computer-readable medium comprising one or more computer-readable instructions that, when executed by at least one processor of a computing device, cause the computing device to:
identify a portion of data on the computing device that is stored in an unrestricted section of memory and accessed by processes while running on the computing device;
allocate a restricted section of memory within the computing device;
indicate that the portion of data is located in the restricted section of memory instead of the unrestricted section of memory that actually stores the portion of data by:
identifying a base memory address of the portion of data; and
overwriting the base memory address of the portion of data with a memory address of the restricted section of memory;
detect an attempt by a process running on the computing device to access, using an unexpected access method, the portion of data within the restricted section of memory;
determine, based at least in part on the process attempting to access the portion of data within the restricted section of memory using the unexpected access method, that the process is malicious; and
perform a security action on the computing device to prevent the malicious process from harming the computing device.

* * * * *